United States Patent [19]

Fleischmann

[11] 4,378,787

[45] Apr. 5, 1983

[54] SOLAR HEATING SYSTEM

[76] Inventor: Dale Fleischmann, P.O. Box 321, Dorchester, Wis. 54425

[21] Appl. No.: 267,947

[22] Filed: May 28, 1981

[51] Int. Cl.³ ............................................. F24J 3/02
[52] U.S. Cl. .................................. 126/430; 62/235.1; 62/324.1; 126/435; 126/436
[58] Field of Search ............... 126/435, 430, 436, 421, 126/429, 432, 433, 427; 62/235.1, 324.1, 236

[56] References Cited

U.S. PATENT DOCUMENTS

| 2,584,573 | 2/1952 | Gay | 126/435 |
|---|---|---|---|
| 3,153,442 | 10/1964 | Silvern | 62/238.4 |
| 3,236,294 | 2/1966 | Thomason | 126/430 |
| 3,803,847 | 4/1974 | McAlister | 62/324.3 |
| 3,841,302 | 10/1974 | Falbel | 126/439 |
| 3,939,818 | 2/1976 | Hamilton et al. | 126/432 |
| 3,960,322 | 6/1976 | Ruff et al. | 62/236 |
| 4,000,850 | 1/1977 | Diggs | 126/427 |
| 4,010,731 | 3/1977 | Harrison | 126/436 |
| 4,012,920 | 3/1977 | Kirschbaum | 62/235.1 |
| 4,051,999 | 10/1977 | Granger | 126/429 |
| 4,103,493 | 8/1978 | Schoenfelder | 126/435 |
| 4,169,554 | 10/1979 | Camp | 126/427 |
| 4,182,406 | 1/1980 | Holbrook | 126/400 |

OTHER PUBLICATIONS

Kreider, Alternate Energy Answers, Jan. 1981, p. 32, Popular Science Magazine.
Harrison, Solar Heat Pumps, Feb. 1981, pp. 72, 73, 110, Mechanix Illustrated.
Fundamentals of Solar Heating-Correspondence Course, U.S. Gov. Printing Office, 1978, pp. 1–6.
Air Conditioning, Heating and Refrigeration News, Jun. 2, 1980, p. 26, Solar Attic.
Ewenstein and Wade, 30 Energy Efficient Houses You Can Build, pp. 204, 263–264.
Bolon, Triple Solar Systems, Oct., 1980, p. 130, Popular Science Magazine.
The Energy Line, Carnot Pump, Oct., 1980, p. 27, Mechanix Illustrated.
Wade, Design and Construction Handbook for Energy Saving Houses, p. 123.

Primary Examiner—Daniel J. O'Connor
Attorney, Agent, or Firm—Henry C. Fuller

[57] ABSTRACT

Solar heating system employing a attic solar collector with a transparent wall facing the sun and a heat absorbing interior in order to heat the air within; a first heat pump to transmit heat from the collector to a remote storage reservoir; and a second heat pump to transfer heat either way between the reservoir and a living space to be heated or cooled. The heat input to the first heat pump is controlled by a damper actuated by excess pressure in the heat pump suction line to decrease air flow across the refrigerant coil of the first heat pump which collects the heat from the attic. A similar damper connected to a refrigerant line for the second heat pump similarly controls heat transfer between a refrigerant coil of the second heat pump and the air space to be heated. The dampers modulate the collection and transfer of heat by the heat pumps to maintain the heat pumps in efficient operating temperature and pressure ranges.

11 Claims, 3 Drawing Figures

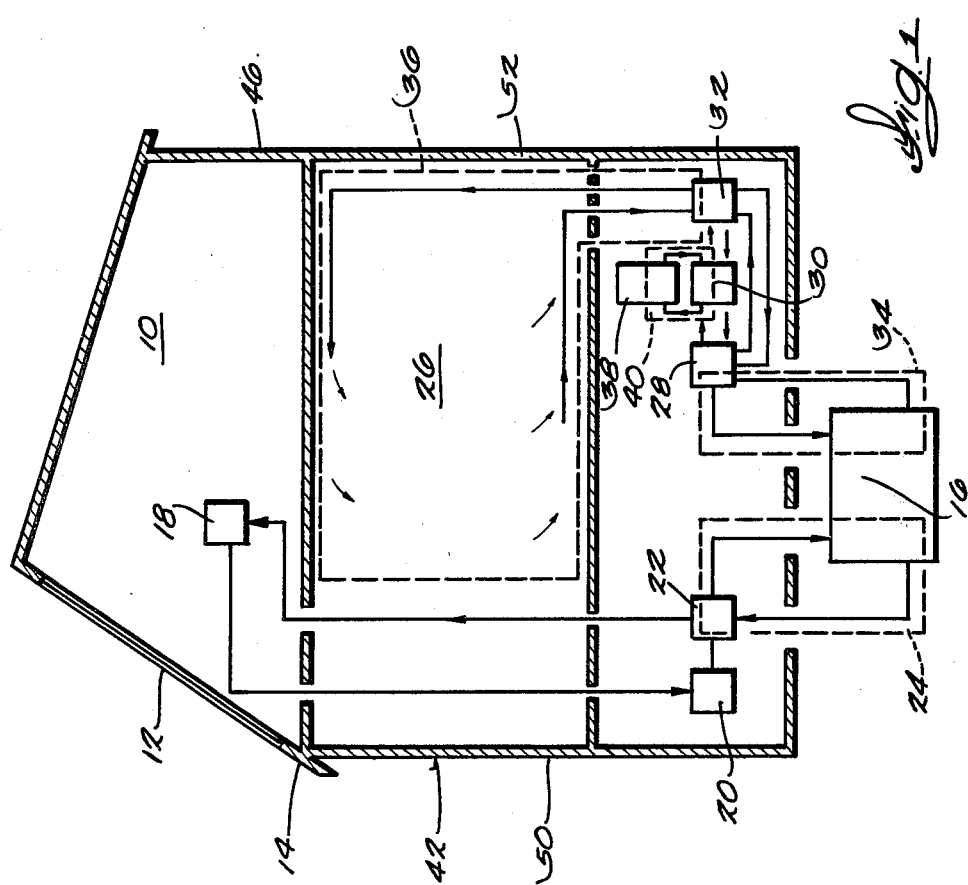

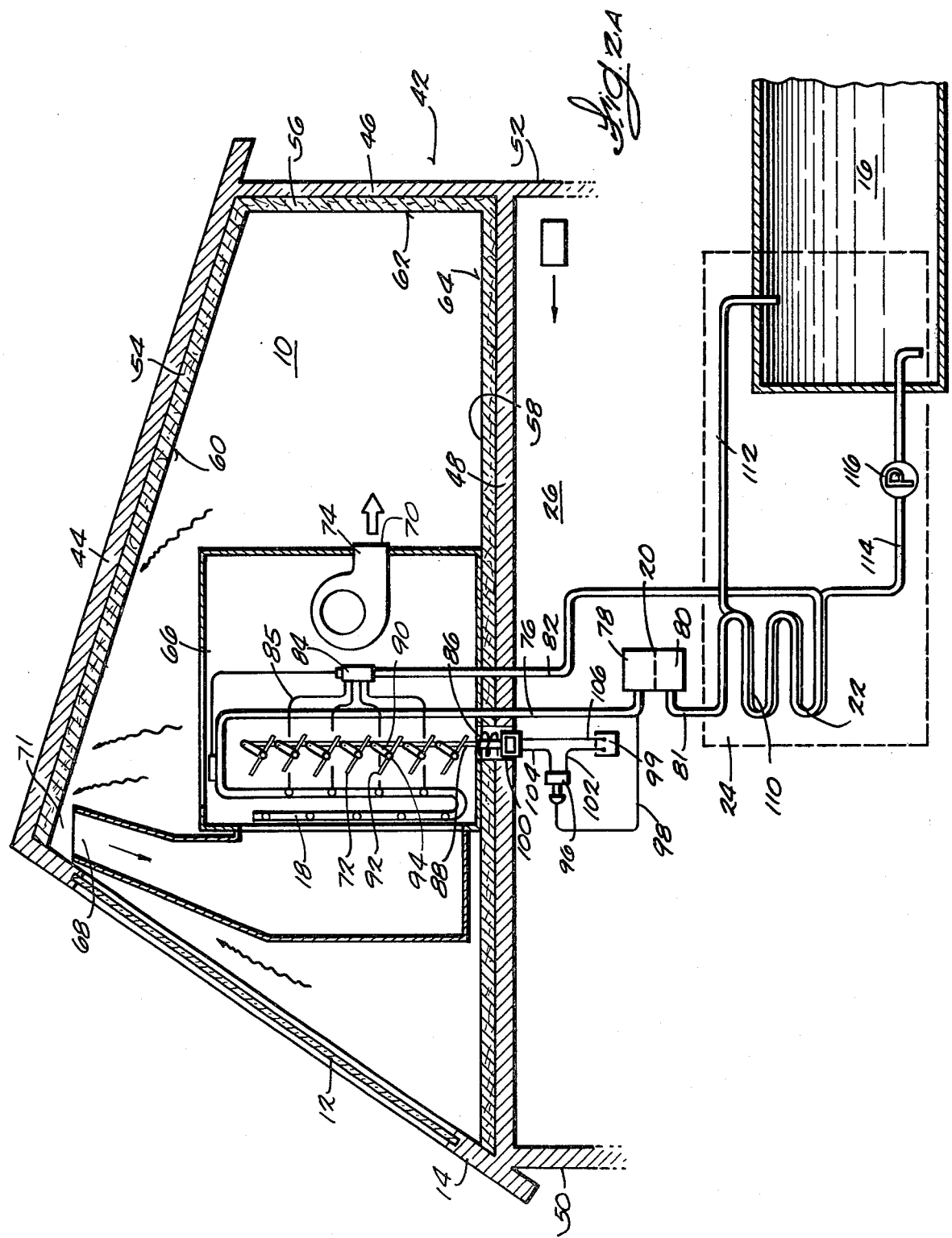

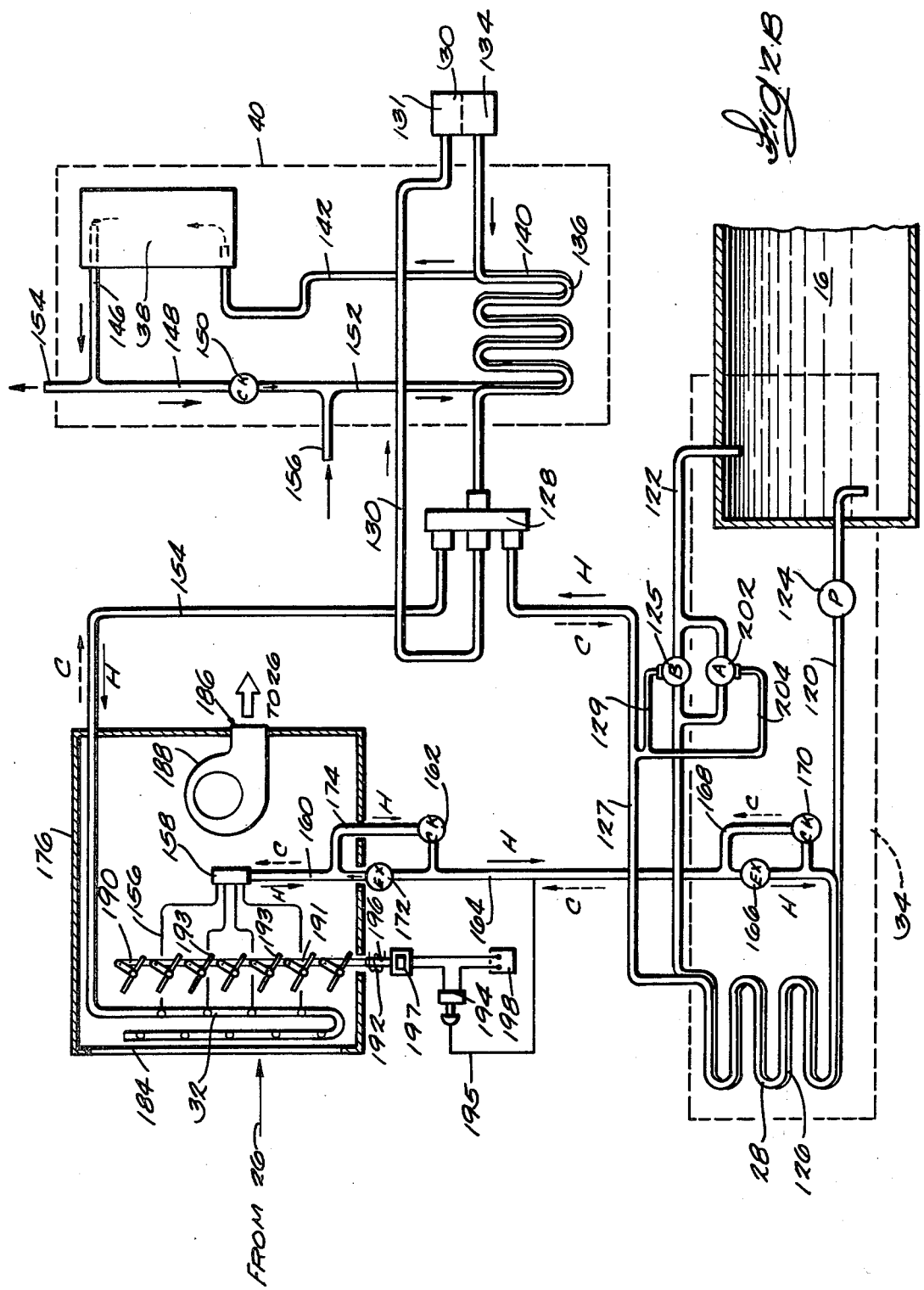

SOLAR HEATING SYSTEM

TECHNICAL FIELD

The present invention relates to space heating, space cooling and hot water heating systems of the type comprising a solar collector, a heat reservoir, a heat circulation system within a living space to be heated or cooled, and means connecting those elements together to condition the air in the living space and to provide hot water for domestic use over a wide range of ambient conditions. The present invention also relates to the incorporation and regulation of heat pumps in such a system.

BACKGROUND ART

Conventional solar heating systems must collect high grade solar heat (defined herein as heat which raises the temperature of a collection medium substantially above the desired temperature for the living space), which is only possible during a short part of even a sunny day. When it is cloudy, or when the sun is low in the sky, the heat collected is low grade heat which cannot be used directly to heat a living space.

Most conventional collectors employ a liquid collection medium such as water or another liquid. Such a system requires comprehensive plumbing on or in the roof of a house. During the night, when no solar collection is possible, the liquid in the exposed plumbing can freeze and burst the pipes. Alternatively, an exotic and less desirable heat collection medium must be provided, or the system must be drained whenever freezing is possible.

When air has been used as the collection medium, heat collection has been much less efficient, for in prior systems a large volume of air laden with low grade heat has been circulated through the heat reservoir to store heat.

Still another problem in solar heating has been to provide simultaneous collection and utilization of heat. Optimum solar collection is often achieved on clear days which are also quite cold, so heat must then be collected rapidly at the same time heat is being withdrawn rapidly from the reservoir to heat the living space. A optimized solar collection and heating system must thus be able to collect heat and to transmit heat to the living space simultaneously, which is not achieved in many systems, or is achieved only by providing auxiliary heat sources.

Furthermore, the art has not provided a solar heating system adapted to supply usable heat from the sun under a wide variety of operating conditions, such as during cloudy days or sunny days and during the day or night.

Finally, the prior art has not provided adequate control mechanisms to allow heat pumps to be employed over a wide variation in operating conditions, to allow solar heat to be extracted and used in a living space when operating conditions are extreme without damaging or inefficiently operating the heat pumps.

SUMMARY OF THE INVENTION

The present invention is an improved solar space heating system comprising an attic with a window to admit sunlight; a remote heat reservoir; a first heat pump to concentrate heat taken from the attic air and transfer the heat to the reservoir; and a second heat pump to concentrate heat and transfer it from the reservoir to the living space to be heated.

The invention is operable to extract low grade solar energy from the attic, allowing operation of the system early and late in the day or during cloudy weather, as well as to extract the usual high grade solar heat during optimum collection conditions. Also, the heat collection system and the living space heating system are autonomous, so heat can be simultaneously stored in the reservoir and withdrawn for use at high rates.

In preferred embodiments of the invention the second heat pump means is reversible to cool the living space during the summer, and the second heat pump can heat domestic tap water at the same time the other described functions of the system are performed.

BRIEF DESCRIPTION OF DRAWINGS

FIG. 1 is a block diagram of an integrated solar heating and cooling system for the living space of a residence or other building, combined with solar means for heating domestic tap water.

FIGS. 2A and 2B are a more detailed schematic view of the system of FIG. 1.

DESCRIPTION OF THE PREFERRED EMBODIMENTS

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

Referring first to FIG. 1, the solar collection system generally comprises an attic air space 10; window means 12 to allow sunlight to pass through wall or roof 14 to heat the air and surfaces within attic air space 10; a heat reservoir 16; first heat pump means including a first refrigerant coil 18, a compressor 20, a second refrigerant coil 22, and associated piping to extract and concentrate relatively low grade heat taken from air space 10; and first transfer means 24 to transfer heat from second refrigerant coil 22 to reservoir 16.

The heat transfer means to supply or remove heat from living space 26 generally includes reversible second heat pump means comprising a third refrigerant coil 28, a second compressor 30, a fourth refrigerant coil 32, and associated piping; second transfer means (within box 34) to transfer heat one way or the other between reservoir 16 and third refrigerant coil 28; and third transfer means (within box 36) to transfer heat one way or the other between fourth refrigerant coil 32 and living space 26.

The hot water heating system to heat domestic tap water comprises a hot water tank 38, fourth transfer means 40 to extract heat from the refrigerant passing through the compressor, and associated piping to supply cold water and extract hot water to and from the hot water heating system.

The individual elements of the solar collection system, heat transfer system, and hot water heating system can now be described in greater detail with reference to FIGS. 2A and 2B.

Referring now to FIG. 2A, building 42 comprises walls 14 and 44, a wall portion 46, and a partition 48 defining attic air space 10 on top of the house and partition 48, wall 50 and wall portion 52 defining heated or cooled living space 26.

The walls of air space 10 are preferably lined with insulating panels 54, 56, and 58 of heat insulating material to confine and reradiate the collected heat within attic space 10. Inner surfaces 60, 62, and 64 of the respective insulating panels are either intrinsically black or painted or coated with a black material to maximize collection and reradiation of solar energy radiating inward through window means 12. Insulating panel 58 also insulates the heated living space 26 from the attic air space 10, as is now conventional in home construction.

First refrigerant coil 18 is contained within forced air duct means 66 to receive heat from attic air circulating in controlled fashion through duct 66. Forced air duct 66 comprises walls defining a conduit connecting air inlet 68 to air outlet 70. As shown by the arrows, air from within the upper extremity 71 of the attic air space 10 (where the hottest air accumulates) enters duct 66 through inlet 68, is forced across coil 18 (when damper means 72 is open) by fan means 74 (which here is a centrifugal or squirrel cage fan), and then passes through air outlet 70 and thus returns to the attic. The size of forced air duct 66 and its contents is greatly exaggerated for clarity, it being understood that in the usual attic forced air duct 66 will occupy only a very small volume compared to the total volume of attic air space 18. In an alternate embodiment of the invention, first refrigerant coil 18 may be located adjacent to upper extremity 71 to directly contact the hottest air in the attic.

The first heat pump means transfers heat from the vicinity of first refrigerant coil 18 to the vicinity of second refrigerant coil 22, and in the process can concentrate the heat so that even low grade heat can be efficiently collected from attic air space 10. Looking at the first heat pump means in more detail, a refrigerant contained within first refrigerant coil 18 at a relatively low pressure evaporates and thus withdraws heat from attic air space 10. The refrigerant vapor is collected in suction line 76 and transmitted through the suction line to the low pressure side 78 of compressor 20. Compressor 20 compresses the refrigerant fluid to form a high pressure (and somewhat hotter) gas at the high pressure side 80 of compressor 20. The gas is then transmitted by line 81 to second refrigerant coil 22, in which the high pressure gaseous refrigerant is condensed to form a liquid, thus releasing much of its heat. The exiting refrigerant is then conveyed by liquid line 82 to thermal expansion valve 84 which meters the refrigerant flow through multiple conduits such as 85 connecting with refrigerant coil 18 to complete the refrigerant cycle of the first heat pump means.

One very important feature of the first heat pump means is that heat is transmitted from the attic air space 10, and more particularly from forced air duct means 66, to first transfer means 24 using a refrigerant gas as the transfer medium. In many prior systems in which an air collector is employed, a forced air duct directly connects the collector to either a reservoir or the heated living space. In such systems, low grade heat is transmitted by movement of a vast quantity of air. In the present system, air movement is limited to circulation within the attic air space, and the heat is transferred in concentrated form in a refrigerant which changes phase when it reaches its destination to release its heat. The system thus concentrates heat to minimize the quantity of a heat bearing medium which must be physically transferred from one place to another, promoting efficiency.

Damper means 72 within duct 66 is provided to regulate the flow of heat into and through the first heat pump, keeping the heat pump within its design operating conditions. Damper 72 is normally open, and closes responsive to a pressure increase above a predetermined level in suction line 76. It works as follows. Opening means 86 (here, a spring) normally pushes linkage bar 88 upward, rotating counterclockwise the several bars such as 90 which are each pivotally attached at one end to linkage bar 88 and rigidly attached at the other end to damper vanes 92 adjacent the vane pivots 94. Thus, when linkage bar 88 is free to travel, spring 86 rotates the vanes 92 of the lowered damper gate into their horizontal position in which air flow is unobstructed. However, when the pressure within suction line 76 reaches a predetermined level, that pressure, conveyed to sensing means 96 (here, a pressure switch) by line 98 communicating with suction line 76, closes pressure switch 96, allowing current from voltage source 99 to flow through control means comprising solenoid coil 100 via wires 102, 104, 106. Linkage bar 88 is thus drawn downward, rotating the vanes of the damper toward a vertical attitude in which the heated air is kept from first refrigerant coil 18.

The foregoing damper means modulated by the pressure in the suction line provides an indirect manner of controlling the pressure within suction line 76. If the air flowing within duct means 66 is hot enough to evaporate the refrigerant too rapidly, the pressure within suction line 76 will exceed the predetermined pressure. The damper means will then tend to shut, reducing airflow across first refrigerant coil 18.

The previously identified first heat transfer means 24 is here a heat exchanger comprising a heat exchange coil 110 in intimate thermal contact with second refrigerant coil 22. Lines 112 and 114 and pump 116 take a heat-retaining fluid medium (usually water) from reservoir 16, circulate the medium through heat exchange coil 110 and return it to reservoir 16, thus moving heat from coil 22 to the water in the reservoir. Second refrigerant coil 22 could be directly immersed in the fluid medium in reservoir 16, although the present system is preferred to prevent any ice formed within reservoir 16 from damaging second refrigerant coil 22.

Heat reservoir 16 can be a insulated tank buried below the frost line in one embodiment or positioned within or adjacent living space 26 in another embodiment of the invention. Heat reservoir 16 may be constructed in any of the various ways known to the art without departing from the present invention.

Turning now to part B of FIG. 2, the heat transfer system connecting reservoir 16 to the living space 26 to heat or cool the living space comprises the aforesaid second and third transfer means 34, 36 and second heat pump. The heat transfer system works as follows when living space 26 is to be heated.

To extract heat from reservoir 16 the fluid medium is first withdrawn and circulated by second transfer means 34, comprising lines 120 and 122, pump 124 and a heat exchanger coil 126 which is in intimate thermal contact with third refrigerant coil 28. Automatic water regulating valve 125 in line 122 opens to increase water flow when the refrigerant pressure in capillary tube 129 (branching from line 127 and connected to a regulating bellows in valve 125) is insufficient and closes to decrease water flow when the refrigerant pressure in capillary tube 129 is excessive. Valve 125 thus causes the pressure in line 127 to tend to remain constant despite fluctuations in the temperature of the fluid drawn from reservoir 16 and circulated through coil 126 to evaporate the refrigerant in third coil 28.

When the system is in its heating mode, the refrigerant vapor formed in third refrigerant coil 28 (which is an evaporator when the system is in a heating mode) is transferred by line 127 through reversing valve 128 and line 130 to the low pressure side 131 of second compressor 30. Compressor 30 compresses the refrigerant to form a dense gas in its output side 134.

The dense gas then traverses heat exchanger coil 136, passing through fourth transfer means 40 to heat domestic tap water circulating counterclockwise through heat exchanger coil 140, line 142, tank 38, line 146, line 148, check valve 150 and line 152 of fourth transfer means 40 and returning to heat exchanger coil 140. As water is removed from tank 38 through a conduit 154, replacement cold water enters the system through conduit 156.

After passing through heat exchanger coil 136, the refrigerant, which still contains substantial heat, passes again through reversing valve 128, then through line 154, which in the heating mode of operation is a liquid line, then through fourth refrigerant coil 32 (which in this mode acts as a condenser). The condensed gas leaving refrigerant coil 32 is then collected in multiple lines 156 and returned through a manifold 158 into line 160, through check valve 162, line 164, and expansion valve 166 via bypass 168 and then back into third refrigerant coil 28.

In the heating mode just described, the flow of refrigerant in lines 127, 154, 160, 164, and bypass 168 is shown by the arrows marked "H".

Heat is transferred from the vicinity of fourth refrigerant coil 32 to the living space 26 via third transfer means 36, which in this embodiment includes a forced air duct 176 for circulation of heated air into the house and collection of return air from the house. Forced air duct 176 has an inlet 184 to collect return air from the living space and an outlet 186 which communicates with the living space 26. Fourth refrigerant coil 32, interposed in the air stream between inlet 184 and outlet 186 created by fan 188, heats the air stream.

Normally open damper means 190 is provided to modulate air flow through the forced air duct 176 responsive to the pressure within refrigerant line 164. A control bar 191 is biased upward by a spring 192, turning the vanes 193 to a horizontal orientation in which airflow is unobstructed. If the pressure in line 164 transmitted to pressure actuated switch means 194 via line 195 drops below a predetermined level, switch 194 closes, drawing ferrous element 196 into solenoid coil 197 against the bias of spring 192, rotating vanes 193 to a vertical position to obstruct airflow. This system thus closes damper 190 to prevent inefficient heating (or even unwanted cooling) of living space 26 whenever the pressure of the condensing fluid just beyond the fourth refrigerant coil 32 is not high enough to raise the pressure in line 195 above a predetermined level. In the heating mode, this means that unless fourth refrigerant coil 32 is transmitting sensible heat to the air within duct means 176, the circulation of air within the heated space is reduced or stopped.

During the summer, the transfer system connecting reservoir 16 to the heated air space can also be operated in a cooling mode to cool air space 26. In the cooling mode of operation reversing valve 128 is switched to reverse the flow in lines 127, 154, 160, and 164, to bypass expansion valve 166 through check valve 170, and to flow through expansion valve 172 and bypass 174. This exchanges the functions of the third and fourth refrigerant coils. The flow of refrigerant in the foregoing parts of the second heat pump in the cooling mode is shown by broken arrows labelled "C".

The closing means for damper 190 is defeated during the summer by opening a manual or automatic switch to disconnect voltage source 198 from the solenoid circuit. Thus, damper 190 remains open all summer.

When the system is used for cooling, the operating conditions in third coil 28, now acting as a condenser, are controlled by water valve 202 which opens when the pressure in capillary tube 204, connecting to refrigerant line 127, exceeds a predetermined value. This increases heat transfer to reservoir 16 when coil 28 has a high heat load to remove, and otherwise decreases heat transfer.

Means could be optionally provided to periodically drain reservoir 16 and replenish it with ground water to transfer heat out of the storage tank when the system is being used for air conditioning. Also, means could be provided to shut down fan 74, compressor 20 and pump 116 during the summer, when adequate heat to heat water in tank 38 is provided by the second heat pump. Excess heat collected within air space 10 by the solar collector can then be vented with the assistance of a conventional attic ventilation system (not shown). Since the solar collecting system is so easy to shut off and restart, it can be shut off and turned on frequently, as during the spring when it is only needed occasionally.

The operating conditions and sizing for the system described herein can be illustrated as follows.

A system of the type described herein was installed in a Wisconsin home located at a latitude of 45 degrees north in a climate averaging 1,495 heating degree days in January. The house required an estimated average of 1,000,000 British Thermal Units (BTU) (250,000 kilocalories, "k") per day for heating.

The heat pump for extraction of heat from the attic collector had a cooling capacity of 36,000 BTU (9100 k) per hour. The heat pump for heating and cooling the house living space had a house heating capacity of 60,000 BTU (15,000 k) per hour and a house cooling capacity of 45,000 BTU (11,000 k) per hour. (These ratings, however, are not necessarily applicable to the present situation because they are based on operating conditions much different than these.)

The January air temperature of the attic collector varied between a low of 34 degrees Fahrenheit (1 degree Celsius) and a high of 150 degrees F. (66 degrees C.) when the interior (lined with polystyrene panels) was unpainted, and the maximum temperature increased to more than 162 degrees F. (72 degrees C.) when the interior sides of the panels were painted black. Fan 74 provided an airflow of 1500 cubic feet per minute (CFM) (0.71 cubic meters per second, "CMS") across first refrigerant coil 18.

Damper 72 was set to close if the refrigerant pressure in line 76 exceeded 84 pounds per square inch (psi) (580,000 Newtons per square meter, "nsm"), to open if the pressure in line 76 dropped below 75 psi (517,000 nsm), and to retain its open or closed position between those pressure extremes. (All pressures stated herein are gauge pressures.) Damper 190 was set to open at 270 psi (1,860,000 nsm) in line 164, to close at 220 psi (1,520,000 nsm) in line 164, and to retain its position between those pressure extremes.

Reservoir 16 was a 9000 gallon tank filled with water and measuring about 8 feet by 20 feet by 7½ feet deep (34 cubic meters; 2.4 meters by 6.1 meters by 2.3 meters deep). Pump 116 was rated at ⅓ horsepower (0.25 kilowatts), and pump 124 was rated at ½ horsepower (0.37 kilowatts). The average water temperature in the reservoir was roughly 83 degrees F. (28 degrees C.), and the temperature under most efficient conditions was between 90 degrees F. (32 degrees C.) and 105 degrees F. (41 degrees C.).

Tank 38 supplied all domestic hot water to the home. During the winter the hot water temperature in tank 38 varied between 120 degrees F. (49 degrees C.) and 180 degrees F. (82 degrees C.), and a typical temperature was about 170 degrees F. (77 degrees C.).

Fan 188 circulated 2250 cubic feet of air per minute (1.06 cubic meters per second) from the living space through duct 176, maintaining the interior temperature of the house during winter between 65 degrees and 75 degrees F. (18 and 24 degrees C.) at all times. No auxiliary heat source was employed during the winter.

The electric power needs of the entire system were estimated to be, on average, 57 kilowatt-hours per day.

I claim:
1. A solar heating system for a building comprising:
A. building walls defining an air space and a living space;
B. means forming at least one wall of said air space to allow solar energy to heat said air space;
C. a heat reservoir;
D. first heat pump means comprising a first refrigerant coil to collect relatively low grade heat from said air space, a first compressor to transform said low grade heat into relatively concentrated heat, and a second refrigerant coil to receive said relatively concentrated heat from said compressor;
E. first transfer means to transmit said relatively concentrated heat from said second refrigerant coil to said reservoir;
F. second heat pump means comprising a third refrigerant coil to collect heat from said reservoir, a second compressor to transform said heat into highly concentrated heat, and fourth refrigerant coil to receive said highly concentrated heat from said second compressor:
G. second transfer means to transmit said heat from said reservoir to said third refrigerant coil; and
H. third transfer means to transmit said highly concentrated heat from said fourth coil into said living space.

2. The system of claim 1 wherein said first refrigerant coil is within said air space.

3. The system of claim 2, wherein said air space is an attic of said building.

4. The system of claim 2, further comprising a forced air duct in said air space communicating between an upper extremity of said air space and said first refrigerant coil.

5. The system of claim 2, 3, or 4, further comprising means to ventilate said air space with air from outside said building when the temperature within said air space exceeds a predetermined level, to prevent the temperature within said air space from exceeding the design temperature for said first heat pump.

6. The system of claim 1 further comprising a tank for heated tap water storage and fourth heat transfer means to transmit heat from said second heat pump means to said tank.

7. The system of claim 1, further comprising means to reverse said second heat pump means to collect heat from said living space and transmit said heat to said reservoir to cool the air within said living space.

8. The system of claim 1, wherein said reservoir comprises an insulated tank containing a heat-retaining fluid.

9. The system of claim 8, wherein said first transfer means comprises a heat exchanger to circulate fluid from said reservoir in intimate thermal contact with said second refrigerant coil.

10. The system of claim 8, wherein said second transfer means comprises a heat exchanger to circulate fluid from said reservoir in intimate thermal contact with said third refrigerant coil.

11. The system of claim 1 wherein said third transfer means comprises a forced air duct communicating between said fourth refrigerant coil and said living space.

* * * * *